United States Patent
Aoki et al.

(10) Patent No.: US 7,532,175 B2
(45) Date of Patent: May 12, 2009

(54) HEAD-UP DISPLAY DEVICE

(75) Inventors: Kunimitsu Aoki, Shizuoka (JP); Go Nakamura, Shizuoka (JP); Yoshihide Takada, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 600 days.

(21) Appl. No.: 11/000,036

(22) Filed: Dec. 1, 2004

(65) Prior Publication Data

US 2005/0156815 A1 Jul. 21, 2005

(30) Foreign Application Priority Data

Dec. 26, 2003 (JP) ............... 2003-434796

(51) Int. Cl.
*G09G 5/00* (2006.01)
(52) U.S. Cl. .................... 345/7; 359/631
(58) Field of Classification Search ............ 345/7; 359/631
See application file for complete search history.

(56) References Cited

U.S. PATENT DOCUMENTS 6,359,737 B1 * 3/2002 Stringfellow ............ 359/631

2005/0162340 A1 * 7/2005 Nagano et al. ............ 345/7

FOREIGN PATENT DOCUMENTS

JP 2645487 5/1997
JP 2001-97073 4/2001

* cited by examiner

*Primary Examiner*—Amr Awad
*Assistant Examiner*—Yong Sim
(74) *Attorney, Agent, or Firm*—Kratz, Quintos & Hanson, LLP

(57) ABSTRACT

A head-up display device includes a display unit for displaying information, a reflector rotatably supported by frame members fixed to a vehicle, and an adjuster for adjusting a rotational position of the reflector by a gearing system. The information displayed on the display unit is reflected by the reflector to a projection area on a vehicle windshield. The adjuster so adjusts the rotational position to allow a vehicle driver to see both a front view through the windshield and a superimposed reflected image of the information. The head-up display device further includes a regulator to allow the reflector to rotate in a rotational direction within a range where the reflector is adjustable by the adjuster, and to prevent the reflector from shifting in a direction other than the rotational direction.

3 Claims, 4 Drawing Sheets

HEAD-UP DISPLAY DEVICE

BACKGROUND OF THE INVENTION

The priority application Number Japanese Patent Application No. 2003-434796 upon which this patent application is based is hereby incorporated by reference.

1. Field of the Invention

This invention relates to a head-up display device. In more detail, this invention relates to the head-up display device including a display unit for displaying information; a reflector supported by a rotational shaft; and an adjuster for adjusting a rotational position of the reflector by a gearing system. The gearing system so adjusts the rotational position of the reflector that the reflector may reflect light of the information from the display unit toward a projection area on a windshield of a vehicle, for allowing a vehicle driver to see both a front view through the windshield and a superimposed reflected image of the information.

2. Description of the Related Art

In recent years, a head-up display device (HUD) has come into use in a driving position of a vehicle, a train, and the like, as information requested by a driver while driving has been increased and diversified. The HUD displays critical information as a reflected image on a windshield of a vehicle to allow the driver to see a front view through a windshield and a superimposed reflected image.

In such an HUD system, a display unit is provided inside an instrument panel of the vehicle, and a reflector, such as a magnifying mirror, reflects light, which contains information, from the display unit toward a projection area on such as a windshield or a combiner. Thus, the vehicle driver sees a view through the projection area and a reflected image superimposed on the projection area.

Meanwhile, drivers have various eye points (viewing positions) according to their sitting heights. When the reflected light is not reflected toward the eye points of the drivers at the projection area, the drivers cannot see superimposed information adequately. For solving this problem, an HUD having an adjuster to adjust a position of a reflector is disclosed in Published Japanese Patent No. 2645487. In the HUD disclosed in this document, the driver adjusts the reflector with the adjuster to see the superimposed reflected image.

In addition, another HUD is disclosed in Japanese Patent Application Laid-open No. 2001-97073. In the HUD disclosed in this second document, corresponding to an engine shutdown, a rotational position of a reflector is so adjusted to prevent sunlight falling through the windshield from being retroreflected toward a display surface of the display unit.

In the conventional HUDs as described above, a mechanism for rotating a rotatable reflector around a rotational shaft by transmitting power from a gearing system is provided. However, since a narrow gap (backlash) exists for driving a gear smoothly, when the vehicle vibrates, the reflector vibrates and visibility of the reflected image is reduced. In particular, as disclosed in the second document, when using a plurality of gears for rotating the reflector (mirror), the backlash increases and the reflector vibrates easily.

Further, in recent years, the reflector has been larger as the display unit has become larger, and the larger reflector is easier to vibrate. The reflected image projected on the projection area also has been enlarged, and the visibility of the reflected image is reduced further. Therefore, there is a problem to prevent the reflector from vibrating with a simple configuration.

Accordingly, it is an object of this invention to provide a head-up display device of which the reflector is prevented from vibrating owing to the backlash.

SUMMARY OF THE INVENTION

In order to attain the object, according to this invention, there is provided a head-up display device including:
a display unit for displaying information;
frame members fixed on a vehicle body;
a reflector supported rotatably by the frame members;
an adjuster for adjusting a rotational position of the reflector by a gearing system; and
a regulator to allow the reflector to shift in a rotational direction in a range where the rotational position of the reflector is adjustable by the adjuster, and to prevent the reflector from shifting in a direction other than the rotational direction,
whereby the adjuster so adjusts the rotational position of the reflector as to allow the reflector to reflect the information from the display unit toward a projection area on a windshield of a vehicle, and to allow a vehicle driver to see both a front view through the windshield and a superimposed reflected image of the information.

According to the above, the reflector is only rotatable in the rotational direction in a range where the adjuster adjusts the rotational position of the reflector. Therefore, even if a vibration of the vehicle is transmitted to the reflector by a backlash of the gearing system of the adjuster, the reflector is prevented from vibrating. Accordingly, the reflected image is prevented from vibrating and degradation of visibility of the reflected image for the vehicle driver is prevented. Further, this head-up display device can deal with a larger reflector, which is more likely to vibrate.

According to the invention, preferably, there is provided the head-up display device, wherein the adjuster is so formed as to absorb a vibration of the reflector caused by a vibration of the vehicle body.

According to the above, even if a vibration of the vehicle is transmitted to the reflector, and the reflector is to vibrate in the rotational direction, the adjuster absorbs the vibration. Thus, the reflector is further prevented from vibrating.

According to the invention, preferably, there is provided the head-up display device,
wherein a reflecting surface of the reflector is so formed as to compensate for distortion of the reflected image displayed on the projection area, and the reflector is supported rotatably around a rotational shaft,
wherein the adjuster is provided in a vicinity of one of corners of the reflector, the one corner is a most distant from the rotational shaft in all corners of the reflector.

According to the above, even the reflector, being easy to vibrate owing to an offset rotational shaft, is prevented from vibrating caused by the vibration of a vehicle.

The above and other objects, features, and advantages of this invention will be better understood when taken in connection with the accompanying drawings and description.

DESCRIPTION OF THE PREFERRED EMBODIMENTS

First Embodiment

A first embodiment of a head-up display device according to this invention will be explained with FIGS. 1 to 5, 6A, and 6B.

Figure 1:
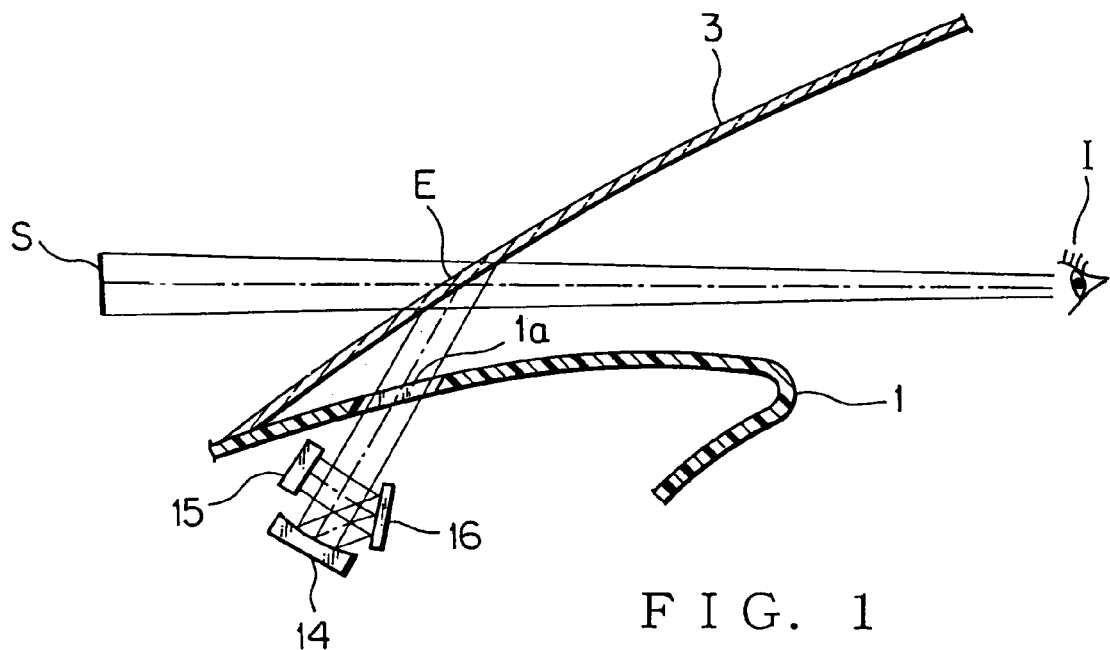
FIG. 1 is a schematic view showing an embodiment of a head-up display device according to this invention.

As shown in FIG. 1, the head-up display device (HUD 10 shown in FIG. 4) is mounted in an instrument panel 1. The HUD 10 includes a magnifying mirror (reflector) 14, a display unit 15 such as a light-emitting display unit or a non-light-emitting display unit, and a flat mirror 16, as the light-emitting display unit, a field emission display unit (FED), a vacuum fluorescent display unit (VFD), and an electroluminescent display unit (ELD) can be used. As the non-light-emitting display unit, an LCD with backlighting can be used.

Light from the display unit 15 is reflected by the flat mirror 16 to the magnifying mirror 14. The light is projected on a projection area E of a vehicle windshield 3 via an opening 1a of the instrument panel 1 by the magnifying mirror 14. Thus, the HUD 10 allows a vehicle driver to see both a front view through the windshield 3 and a reflected image S made of projected light.

Figure 2:
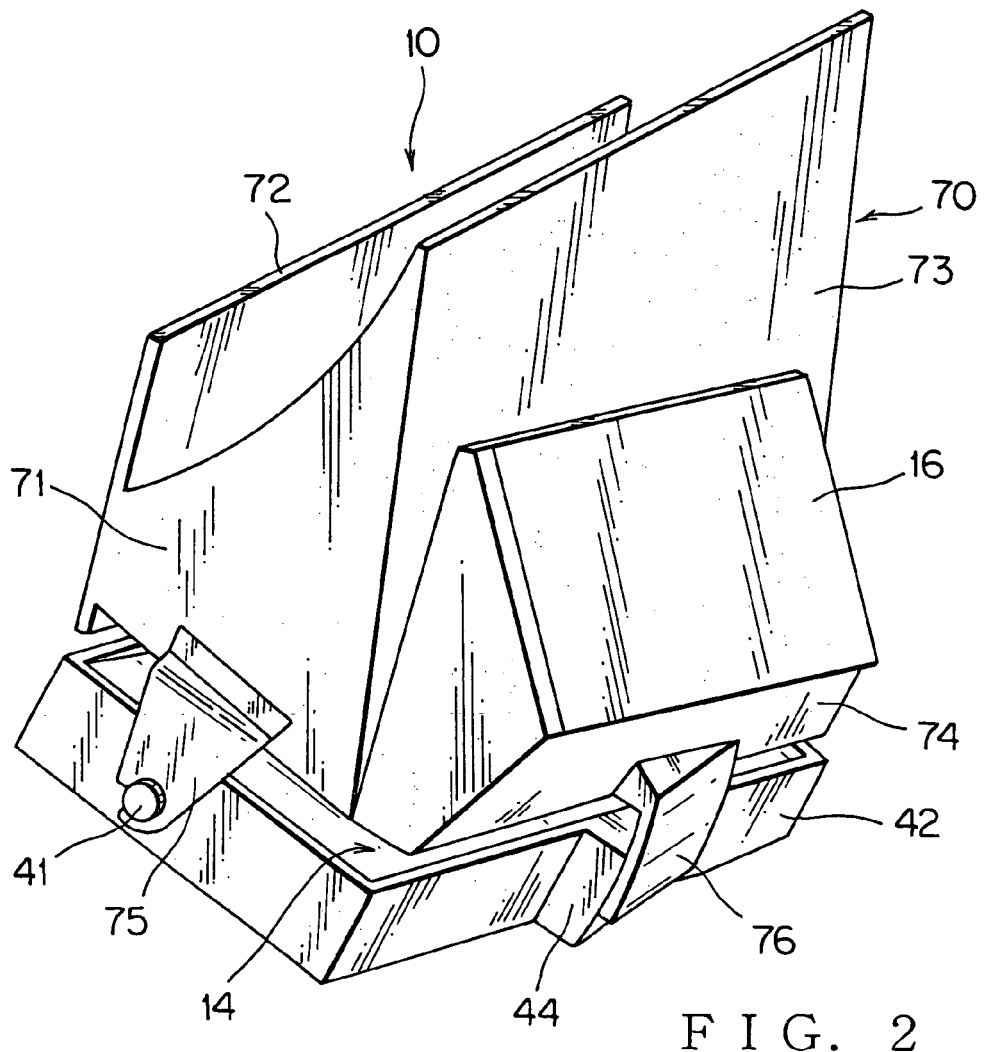
FIG. 2 is a perspective view of the head-up display device.
Figure 3:
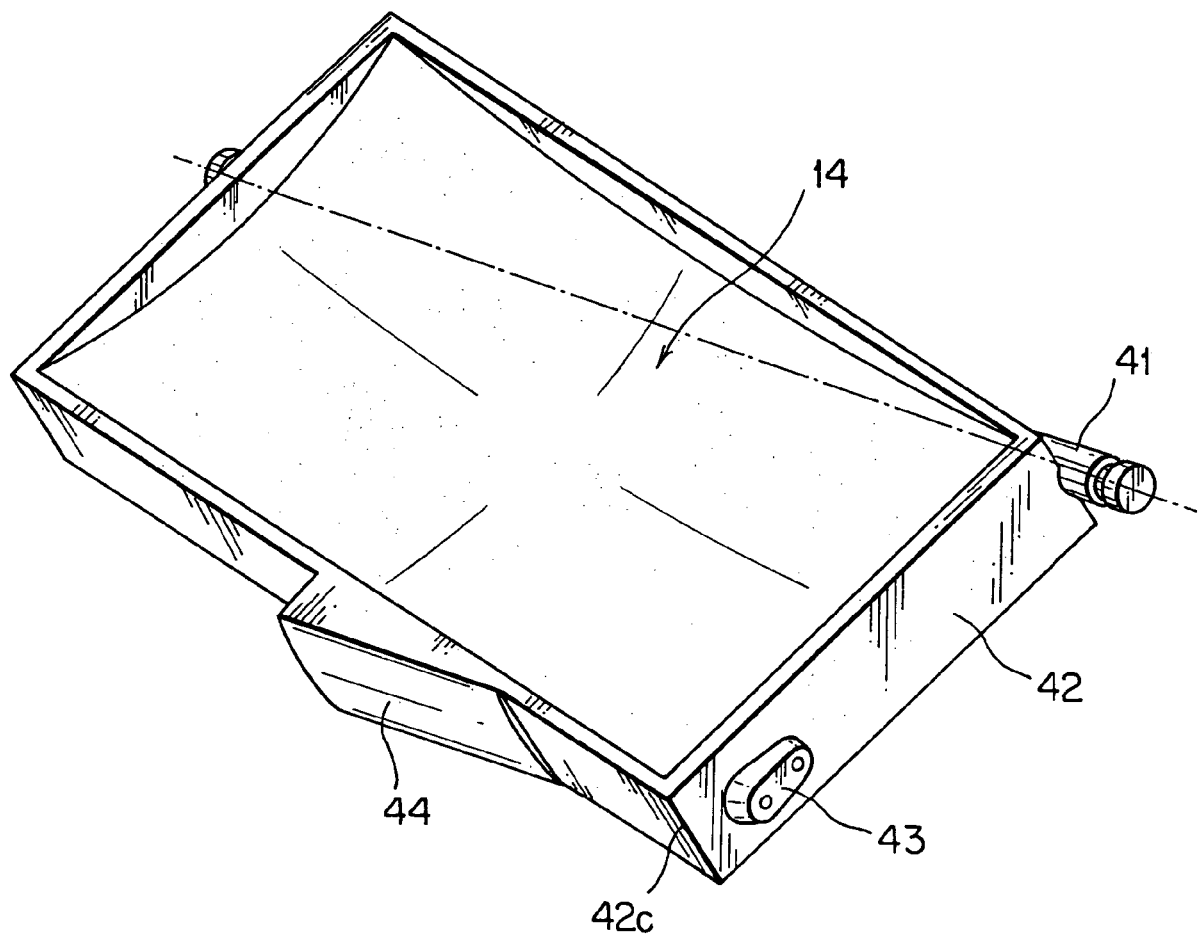
FIG. 3 is a perspective view showing a holder of the head-up display device according to this invention.
Figure 4:
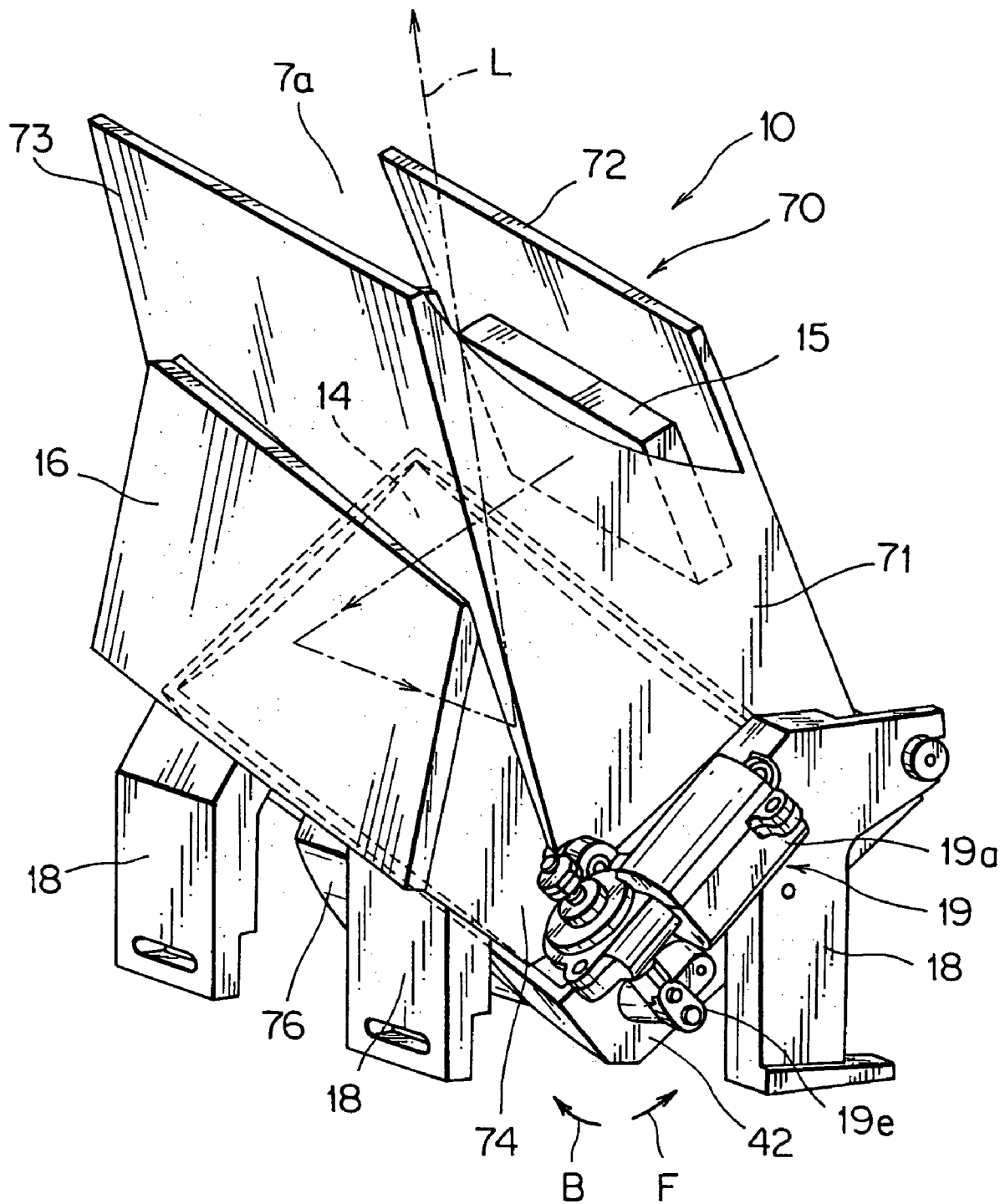
FIG. 4 is a perspective view of the head-up display device according to this invention.

FIGS. 2 to 4 show the HUD 10 according to this invention. The HUD 10 is a unit including a holder 42 housing the magnifying mirror 14 and a rotational shaft 41, and a case 70 housing the display unit 15 and the flat mirror 16.

The magnifying mirror 14 is formed in a substantially oblong shape, and made of a concave lens, an aspherical lens, and the like. The magnifying mirror 14 rotates around the rotational shaft 41 in the holder 42. Both ends of the rotational shaft 41 protrude from, and are supported rotatably by the holder 42.

Since the windshield 3 is formed in a non-planar shape having curvatures in both horizontal and vertical directions, the reflected image S displayed on the projection area E is distorted. Therefore, the rotational shaft 41 so delimits rotational direction of the magnifying mirror 14 as to compensate for distortion. In this first embodiment, as shown in FIG. 3, the rotational shaft 41 is so provided as not to pass through the center of the magnifying mirror 14, and as to intersect each of a longitudinal side and a side perpendicular to the longitudinal side of the magnifying mirror 14.

As shown in FIG. 2, the case 70 is formed in a hollow box shape having openings opposite to the magnifying mirror 14 and an opening surrounded by the instrument panel 1 (FIG. 1). Shapes of the openings respectively correspond to the shapes of the magnifying mirror 14 and the opening surrounded by the instrument panel 1. Therefore, the light reflected by the magnifying mirror 14 passes via an interior of the case 70. A pair of supports 75 (only one support is shown) extended from both sidewalls 71 (only one sidewall is shown) rotatably support the both ends of the rotational shaft 41. Thus, the holder 42 is rotatably mounted on the case 70.

The display unit 15 is provided at a specific position on an inner surface of an upper wall 72 continuing to the sidewalls 71 of the case 70. A lower wall 73 opposite to the upper wall 72 has an opening (not shown) being larger than an outer shape of the display unit 15. A mirror holder 74 is continued to the opening. The flat mirror 16 is so positioned in the mirror holder 74 as to reflect the light from the display unit 15 to the magnifying mirror 14.

The case 70 is so mounted on a vehicle body by a plurality of frame members 18 (for example, four frame members, although only three are shown in FIG. 4 due to its perspective view) that an opening 7a, via which the light projected by the magnifying mirror 14 passes, is opposite to an opening 1a of the instrument panel 1. An adjuster 19 is provided in the vicinity of a corner 42c (FIG. 3) of the magnifying mirror 14 having the longest direct distance from the rotational shaft 41 in all corners of the magnifying mirror 14.

Figure 5:
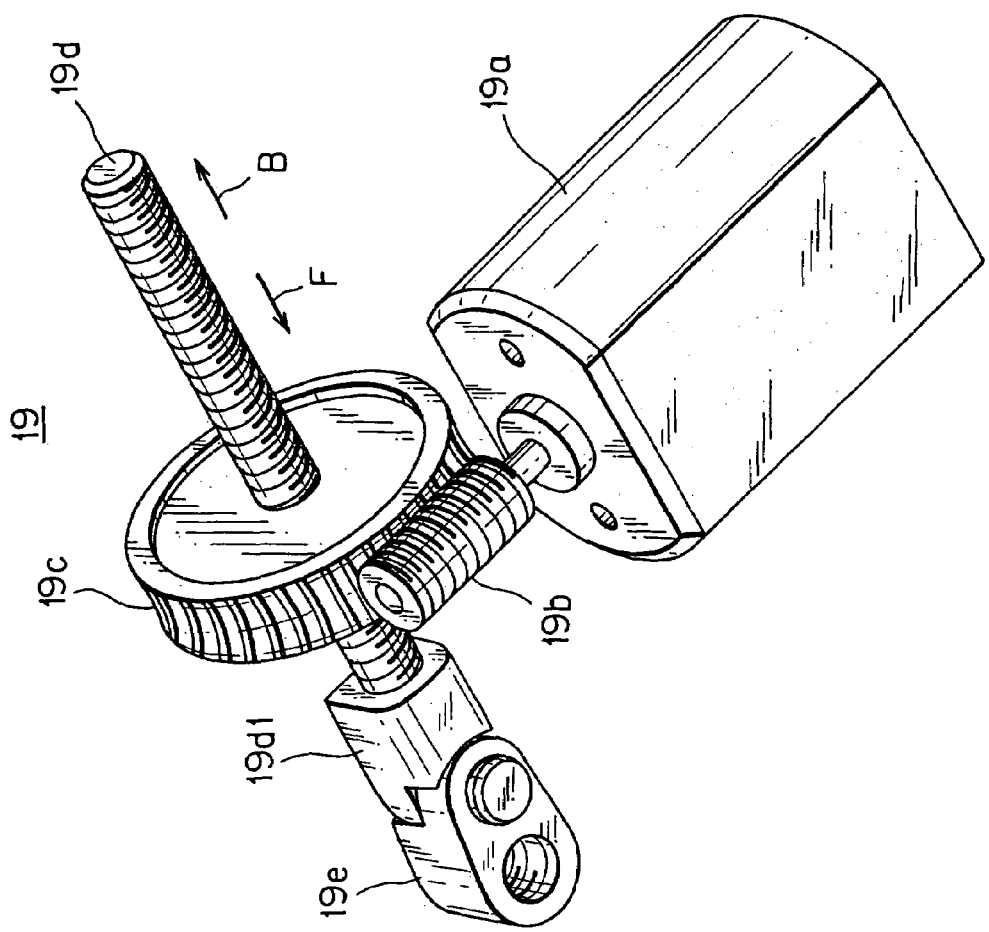
FIG. 5 is a schematic view of an adjuster 19 of the head-up display device according to this invention.

The adjuster 19, as shown in FIG. 5, includes a motor 19a; a worm gear 19b provided at a front end of an output shaft of the motor 19a; a turning gear 19c screwing together with the worm gear 19b; a transmission shaft 19d screwing together with a center screw hole of the turning gear 19c; and a coupler 19e provided at an end of the transmission shaft 19d, and coupling with the holder 42.

Figure 6A:
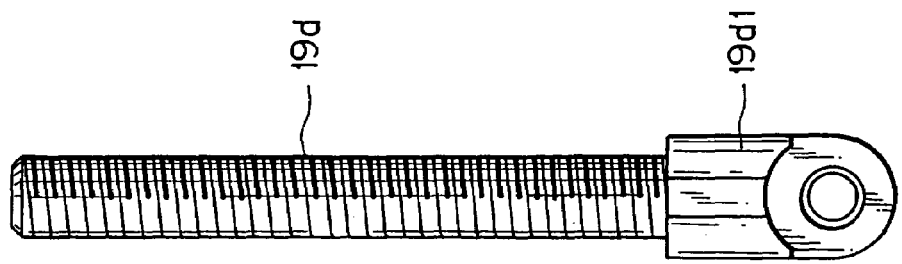
FIG. 6A is a partially enlarged front view of a transmission shaft 19d of the adjuster 19 in FIG. 5. according to this invention.
Figure 6B:
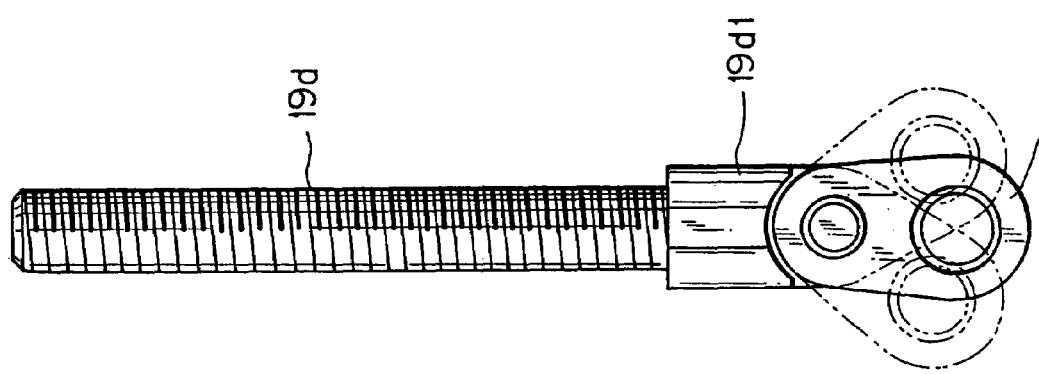
FIG. 6B is a partially enlarged front view of a transmission shaft 19d, on which a coupler 19e is mounted, of the adjuster 19 in FIG. 5 according to this invention.

FIG. 6A shows a front view of the transmission shaft 19d. FIG. 6B shows a front view of the transmission shaft 19d with the coupler 19e. The transmission shaft 19d is a metal, round bar of which surface has a helical groove. A mounting part 19d1 for mounting rotatably the coupler 19e on the transmission shaft 19d is provided at an end of the transmission shaft 19d.

The coupler 19e is also mounted on a mounting part 43 (FIG. 3) at the holder 42 provided in the vicinity of a corner 42c of the holder 42. The coupler 19e is so configured as to be rotatable in directions shown by a double-headed arrow in FIG. 6B. Thereby, a vibration of the magnifying mirror 14 (reflector) is absorbed.

Incidentally, this invention is not limited to this embodiment. For example, the transmission shaft 19d made of synthetic resin absorbs the vibration of the magnifying mirror 14 owing solely to resiliency of the transmission shaft 19d. For another example, the rotatable coupler 19e with the synthetic-resin-made transmission shaft 19d absorbs the vibration. Thus, the adjuster 19 of this invention can be implemented in various ways.

When the motor 19a of the adjuster 19 rotates the worm gear 19b, the turning gear 19c rotates according to the rotation of the worm gear 19b, and the transmission shaft 19d is shifted according to the rotation of the turning gear 19c in a direction along an arrow F or an arrow B shown in FIG. 5. A travel distance of the transmission shaft 19d is transmitted via the coupler 19e to the holder 42. Thereby, the holder 42 is shifted in the direction along the arrow F or the arrow B shown in FIG. 4, and the rotational center is adjusted.

Further, a holder sliding part 44 and a case sliding part 76 are provided respectively on a sidewall in the vicinity of the corner 42c of the holder 42, and on a sidewall of the mirror holder 74 of the case 70. A pair of the sliding parts 44, 76 works as a regulator to regulate a rotating range of the magnifying mirror (reflector) 14 being adjustable by the adjuster 19. The pair of the sliding parts (regulator) 44, 76 allows the magnifying mirror 14 to rotate in rotational directions B, F within the rotating range, and prevents the magnifying mirror 14 from shifting in a direction other than the rotational direction.

The holder sliding part 44 has a substantially triangle pole cross-section, and projects from the holder 42. The case sliding part 76 is so formed as to regulate the rotating range of the holder sliding part 44 and to allow the holder sliding part 44 to slide on the case sliding part 76 within the rotating range.

Thus, the pair of the holder sliding part 44 of the holder 42 and the case sliding part 76 of the case 70 regulates the movement of the magnifying mirror 14. Incidentally, this invention is not limited to the configuration described above. Various embodiments can be adopted according to this invention. For example, the case sliding part 76 may fully cover the holder sliding part 44.

Second Embodiment

A second embodiment of an operation of a head-up display device (HUD) 10 according to this invention as described above will be explained.

In the HUD 10, as shown in FIG. 4, when information is displayed on a display unit 15, light L of this information is reflected by a flat mirror 16 toward a magnifying mirror 14. The magnifying mirror 14 reflects the light L toward a projection area E shown in FIG. 1 on a windshield 3 shown in FIG. 1. Thereby, a vehicle driver sees both a view through the windshield 3 and a superimposed reflected image S shown in FIG. 1 of the information.

For adjusting a rotational position of the magnifying mirror 14, a vehicle driver operates an adjuster switch (not shown) on an instrument panel 1 shown in FIG. 1 to make a motor 19a rotate in a direction where the reflected light L approaches an eye point I shown in FIG. 1, while seeing the reflected image S displayed on the projection area E. While the vehicle driver operates the adjuster switch (not shown), the motor 19a rotates a worm gear 19b shown in FIG. 5, and a transmission shaft 19d shown in FIG. 5 is shifted according to rotation of the worm gear 19b. The magnifying mirror 14 is rotated around a rotational shaft 41 shown in FIG. 3 according to a travel distance of the transmission shaft 19d in the direction that the vehicle driver instructs by operation of the adjuster switch (not shown). When the reflected light L is reflected toward the eye point I, the vehicle driver stops operating the adjuster switch.

When the vehicle is vibrating while running, this vibration is transmitted via a case 70 shown in FIG. 2 and an adjuster 19 to a holder 42. However, a case sliding part 76 prevents a holder sliding part 44 shown in FIG. 2 from shifting according to the vibration. Thus, the holder 42 is prevented from shifting except rotating in its rotational directions B, F. Further, since the holder 42 is rotatable in the rotational directions B and F, and a coupler 19e couples the holder 42 to the transmission shaft 19d, the vibration is absorbed by rotation of the coupler 19e in either of the rotational directions B, F.

Incidentally, in these first and second embodiments, the magnifying mirror 14 works as a reflector in claims. However, this invention is not limited to this. Various embodiments can be adopted to this invention. For example, so long as the flat mirror 16 is rotatable, a regulator for the flat mirror 16 can be employed.

Having now fully described the invention, it will be apparent to one of ordinary skill in the art that many changes and modifications can be made thereto without departing from the scope of the invention as set forth herein.

What is claimed is:

1. A head-up display device comprising:
a display unit for displaying information;
frame members fixed on a vehicle body;
a reflector disposed in a holder and supported rotatably by the frame members for rotating in a rotational direction, relative to the frame members;
an adjuster for adjusting a rotational position of the reflector by a gearing system; and
a regulator to allow the reflector to shift in the rotational direction solely in a rotating range where the rotational position of the reflector is adjustable by the adjuster, and to prevent the reflector from shifting, relative to the frame members, in a direction other than the rotational direction,
whereby said adjuster so adjusts the rotational position of the reflector as to allow the reflector to reflect the information from the display unit toward a projection area on a windshield of a vehicle, and to allow a vehicle driver to see both a front view through the windshield and a superimposed reflected image of the information, and
wherein said regulator includes a holder sliding part mounted on the holder, that continuously contacts and slides on a case sliding part formed on the frame members.

2. The head-up display device as claimed in claim 1, wherein the adjuster is so formed as to absorb a vibration of the reflector caused by a vibration of the vehicle body.

3. A head-up display device, comprising:
a display unit for displaying information;
frame members fixed on a vehicle body;
a reflector supported rotatably by the frame members for rotating in a rotational direction;
an adjuster for adjusting a rotational position of the reflector by a gearings system; and
a regulator to allow the reflector to shift in the rotational direction in a rotating range where the rotational position of the reflector is adjustable by the adjuster, and to prevent the reflector from shifting in a direction other than the rotational direction,
whereby said adjuster so adjusts the rotational position of the reflector as to allow the reflector to reflect the information from the display unit toward a projection area on a windshield of a vehicle, and to allow a vehicle driver to see both a front view through the windshield and a superimposed reflected image of the information, and
wherein a holder sliding part having a substantially triangle pole cross-section mounted on a holder slides on a case sliding part formed on case within the rotating range,
a reflecting surface of the reflector is so formed as to compensate for distortion of the reflected image displayed on the projection area, and the reflector is supported rotatably around a rotational shaft, and
said adjuster is provided in a vicinity of one of corners of the reflector, said one of corners is a corner of the reflector which is the farthest from the rotational shaft.

* * * * *